(12) United States Patent
Katano et al.

(10) Patent No.: US 6,295,412 B1
(45) Date of Patent: Sep. 25, 2001

(54) SHAKE-PROOF CAMERA

(75) Inventors: Yuji Katano, Kawasaki; Hidenori Miyamoto, Urayasu, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/416,887

(22) Filed: Oct. 13, 1999

Related U.S. Application Data

(63) Continuation of application No. 08/808,670, filed on Feb. 28, 1997, now abandoned, which is a continuation of application No. 08/496,179, filed on Jun. 28, 1995, now abandoned.

(30) Foreign Application Priority Data

Jun. 28, 1994 (JP) .................................................. 6-146593

(51) Int. Cl.[7] .................................................. G03B 17/04
(52) U.S. Cl. .............................. 396/55; 396/90; 396/349; 396/448
(58) Field of Search .............................. 396/52–55, 349, 396/448, 90; 359/554, 557

(56) References Cited

U.S. PATENT DOCUMENTS

| | | | |
|---|---|---|---|
| 4,731,669 | 3/1988 | Hayashi et al. | 348/208 |
| 4,990,944 | 2/1991 | Yamamoto et al. | 396/448 X |
| 5,117,246 | 5/1992 | Takahashi et al. | 396/55 |
| 5,153,633 | 10/1992 | Otani | 396/55 |
| 5,181,056 | 1/1993 | Noguchi et al. | 396/55 |
| 5,198,856 | 3/1993 | Odaka et al. | 250/214 LS |
| 5,280,320 | 1/1994 | Kobayashi et al. | 396/85 |
| 5,398,132 | 3/1995 | Otani | 359/557 |

*Primary Examiner*—W. B. Perkey
(74) *Attorney, Agent, or Firm*—Staas & Halsey LLP

(57) ABSTRACT

A shake-proof camera comprises a shake-correcting lens portion for correcting a shake by changing an optical axis of a photographic optical system and a moving lens portion disposed in the vicinity of the shake-correcting lens portion and arranged as movable in a direction of the optical axis, and further is provided with a shake-correcting lens lock apparatus for locking the shake-correcting lens portion by bringing the moving lens portion into contact with the shake-correcting lens portion.

19 Claims, 10 Drawing Sheets

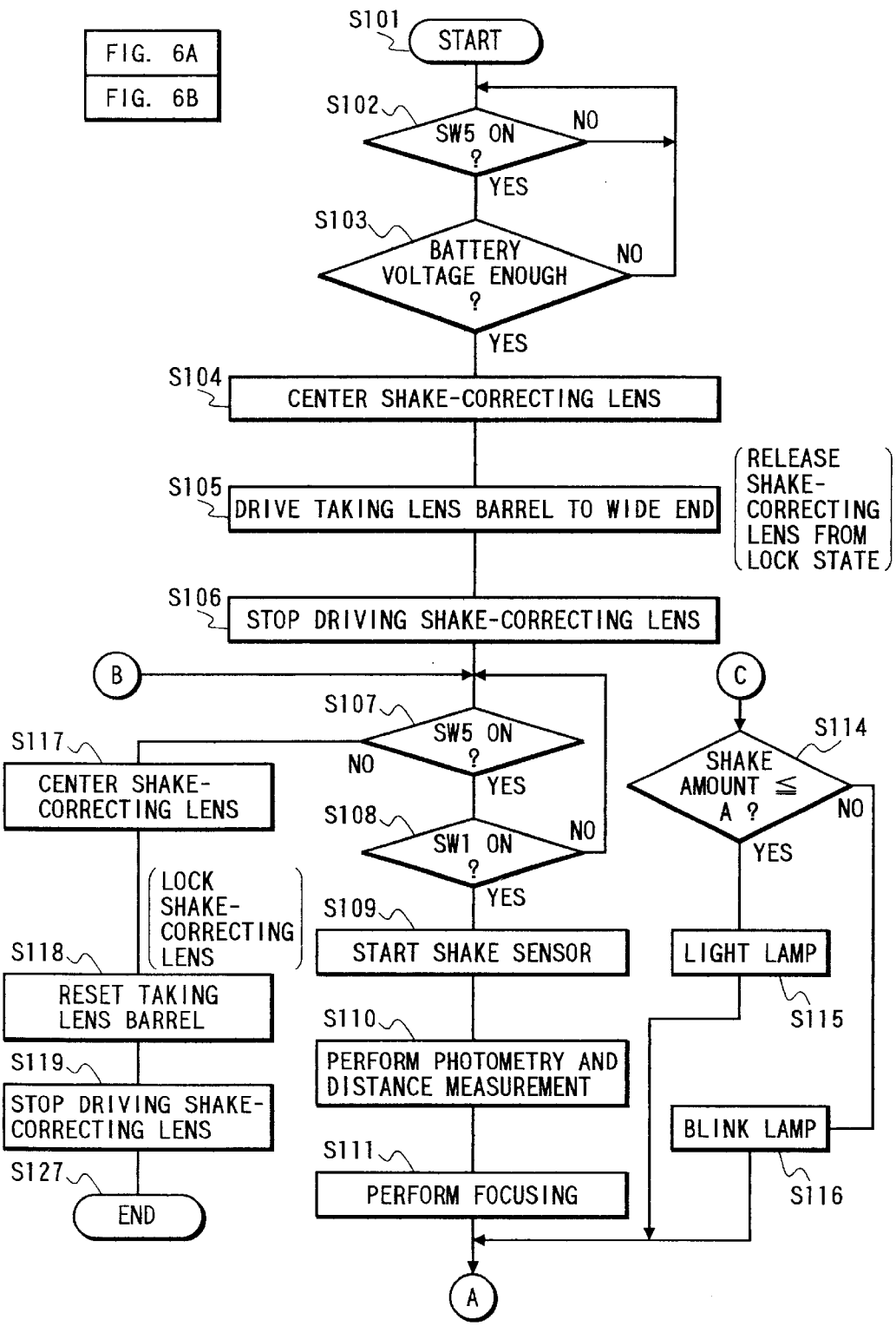

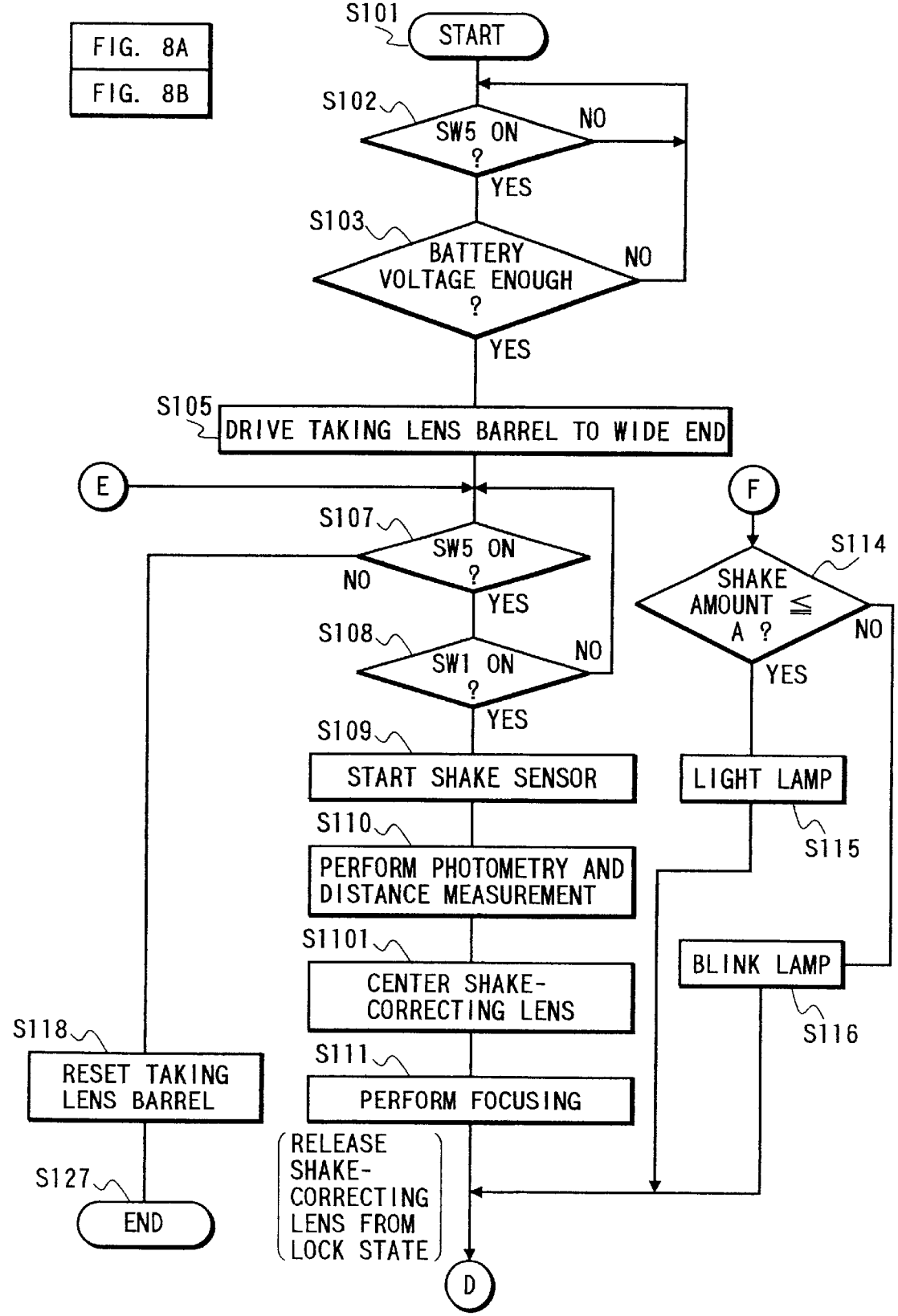

SHAKE-PROOF CAMERA

This application is a continuation of application Ser. No. 08/808,670, filed Feb. 28, 1997, now abandoned, which is a continuation of application Ser. No. 08/496,179, filed Jun. 28, 1995, now abandoned.

BACKGROUND OF THE INVENTION

1. Field of the Invention

The present invention relates to a shake-proof camera for suppressing a camera shake by moving the optical axis of a shake-proof optical system, and more particularly to a shake-proof camera of a type to electromagnetically drive the shake-proof optical system.

2. Related Background Art

An example of the conventional shake-proof camera of this type is constructed in such a structure that locking means for locking or unlocking correction optical means at a predetermined position is operated in synchronization with movement of a lens barrel for holding an optical system including the correction optical means between a retracted (or collapsed) state and a photography preparation state (as disclosed for example in Japanese Laid-open Patent Application No. 5-100280).

However, because the conventional shake-proof camera as described above was so arranged that the shake-proof optical system was not able to be locked without a retracting operation of the lens barrel, it was impossible to surely lock the shake-proof optical system in accordance with any photographic situations. Also, because the shake-proof optical system was not able to be locked without using a new actuator as locking means, the structure became complex and the size and the cost were increased.

SUMMARY OF THE INVENTION

An object of the present invention to provide a shake-proof camera which can lock and unlock the shake-proof optical system without using a new actuator or the like and without performing extra manipulation.

To achieve the above object, the present invention provides a shake-proof camera comprising a shake-correcting lens portion for correcting a shake by changing an optical axis of a photographic optical system, and a moving lens portion disposed in the vicinity of the shake-correcting lens portion and arranged as movable in the optical-axis direction, wherein the shake-proof camera is provided with a shake-correcting lens lock apparatus for locking the shake-correcting lens portion by bringing the moving lens portion into contact with the shake-correcting lens portion.

Preferably, the shake-proof camera further comprises a shake correction drive portion comprised of a permanent magnet and an iron core moving relative to each other, which electromagnetically drives the shake-correcting lens portion.

The shake-correcting lens lock apparatus may be arranged to lock the moving lens portion and the shake-correcting lens portion by attracting and holding them by the permanent magnet included in the shake correction drive portion.

Preferably, the moving lens portion is a zoom lens or a focus lens.

The shake-correcting lens lock apparatus preferably performs the locking in synchronization with off of a power switch, in synchronization with a closing operation of a photographic lens barrier, in synchronization with an end of a shutter release operation, or in synchronization with a return operation of the focus lens.

The shake-correcting lens lock apparatus preferably returns the shake-correcting lens portion to a shake-proof reference position before locking.

Further, the shake-correcting lens lock apparatus preferably returns the moving lens portion and the shake-correcting lens portion to respective lens receding positions after they are brought into contact with each other or as they are kept in contact with each other. Or, the shake-correcting lens lock apparatus preferably brings the moving lens portion and the shake-correcting lens portion into contact with each other after the moving lens portion and the shake-correcting lens portion have returned to the lens receding positions.

Also, the shake-correcting lens lock apparatus preferably performs the unlocking in synchronization with on of the power switch, in synchronization with an opening operation of the photographic lens barrier, in synchronization with manipulation of photography preparation start, in synchronization with the shutter release operation, or as holding the lock position.

In the present invention the moving lens such as the focus lens is moved to get into contact with the shake-correcting lens whereby the shake-correcting lens is locked in a non-moving state. Therefore, the shake-correcting lens can be surely locked according to photographic situation, and no new actuator is needed.

The above and other objects, features and advantages of the present invention are explained hereinafter and may be better understood by reference to the drawings and the descriptive matter which follows.

DETAILED DESCRIPTION OF THE PREFERRED EMBODIMENTS

First Embodiment

The present invention will be described in further detail with the embodiments thereof by reference to the drawings.

Figure 1:
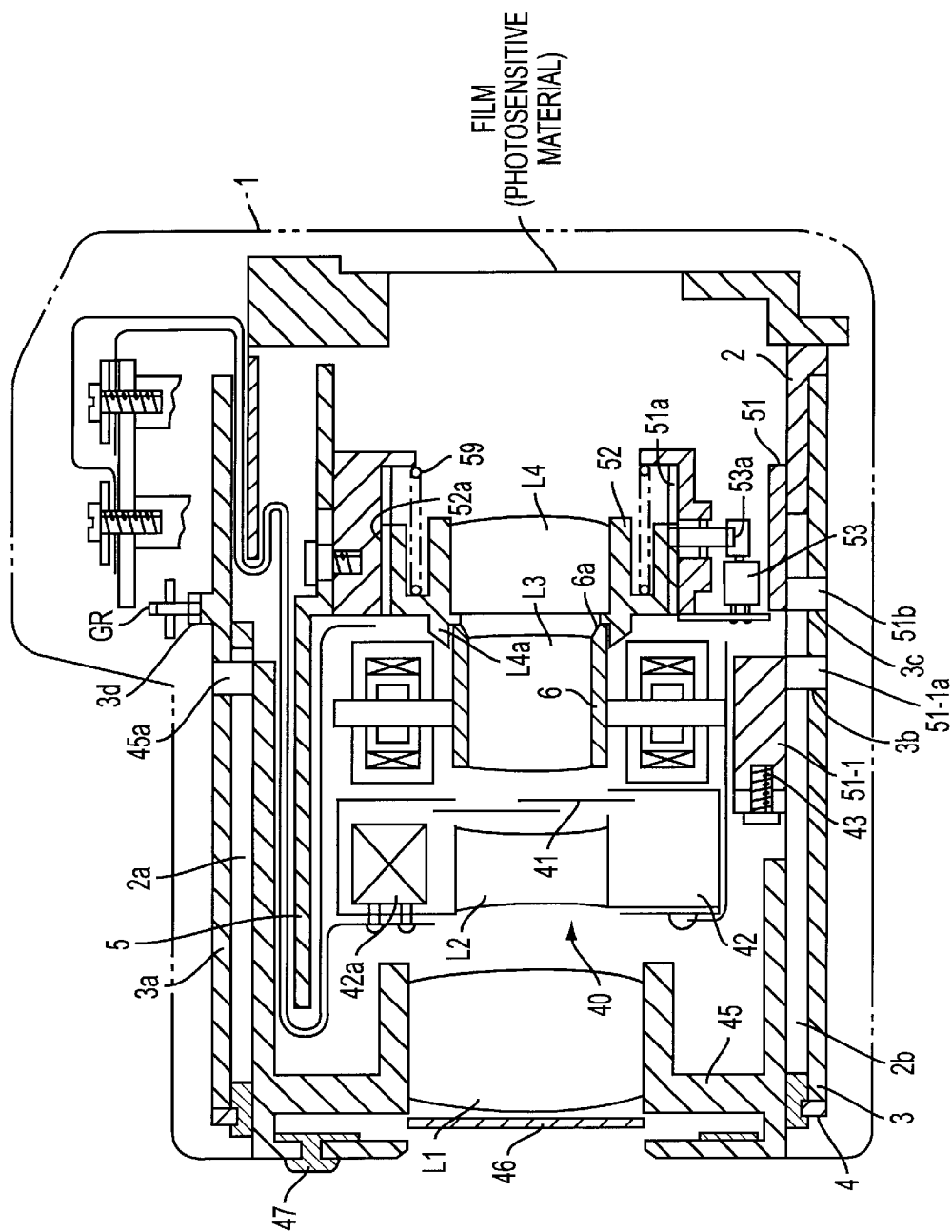
FIG. 1 is a side cross section of a barrel-integral-type camera (zoom camera) to which a first embodiment of the shake-proof camera according to the present invention is applied, showing a locking state when it is in a non-taking state (when retracted)
Figure 2:
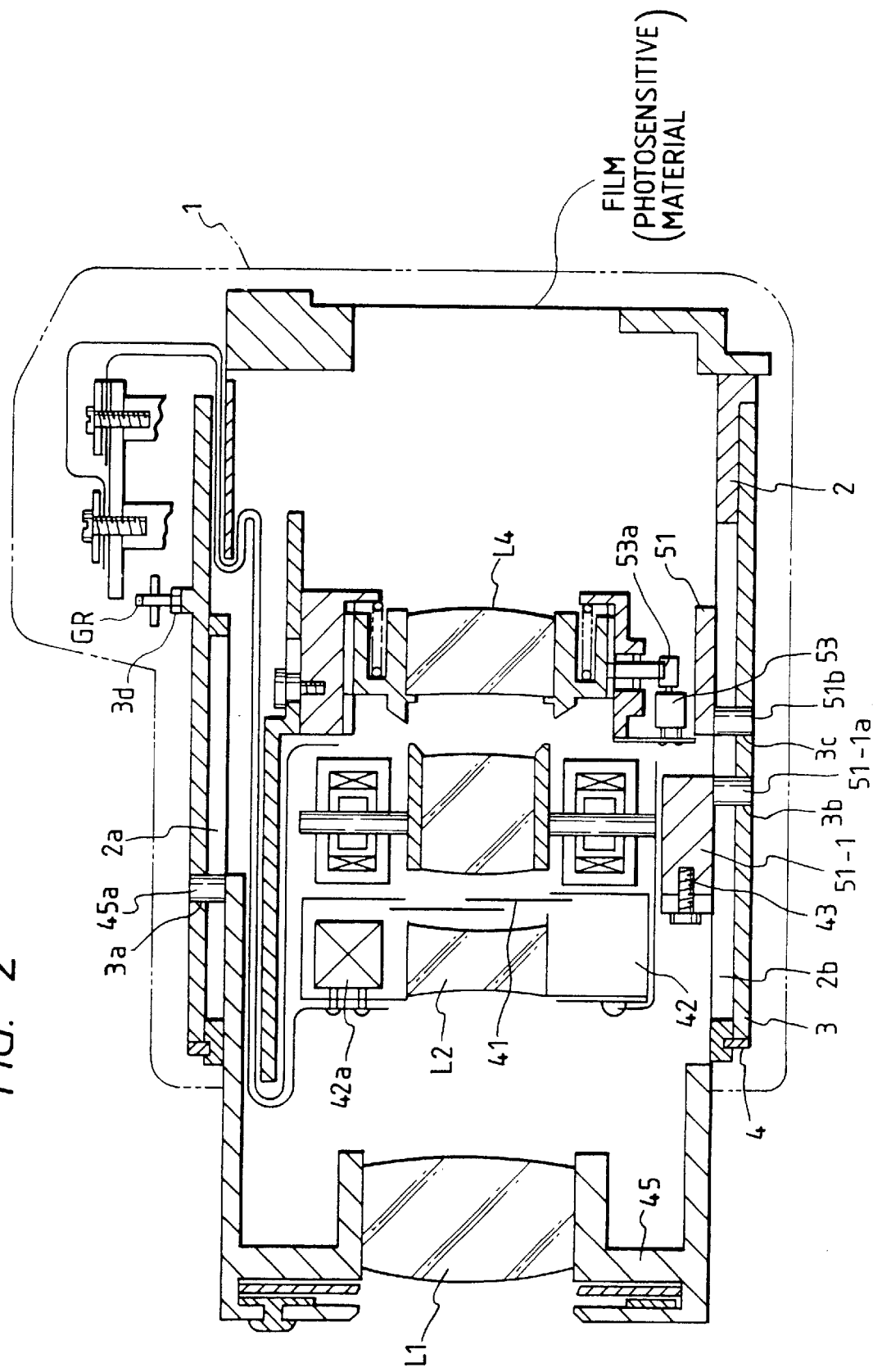
FIG. 2 is a side cross section of the barrel-integral-type camera (zoom camera) to which the first embodiment of the shake-proof camera according to the present invention is applied, showing an unlocking state thereof.

FIG. 1 and FIG. 2 are side cross sections of a barrel-integral-type camera (zoom camera) to which the first embodiment of the shake-proof camera according to the present invention is applied. FIG. 1 is a drawing to show a locking state of a shake-correcting lens, in which the camera is in a non-taking state as keeping a lens barrel in a retracted state, while FIG. 2 a drawing to show an unlocking state of the shake-correcting lens, in which the power of the camera is turned on and the lens barrel is kept in a projected state ready for photography.

A stationary barrel 2 is fixed to a camera body 1, and straight grooves 2a, 2b along the optical-axis direction are formed in the peripheral surface of the stationary barrel 2. A cam barrel 3 is rotatably fit on the outer periphery of the stationary barrel 2, and a ring 4 is arranged to stop slip-off of the cam barrel 3. A gear portion 3d is formed on the outer periphery of the cam barrel 3, and this gear portion 3d is connected through a gear GR to a zoom motor 77 (FIG. 5) to be rotated thereby, so as to rotate the cam barrel 3. Cam grooves 3a, 3b, 3c are formed on the peripheral surface of the cam barrel 3.

Another barrel 45 for holding a front unit lens L1 is set inside the stationary barrel 2, and a cam follower 45a planted in the outer periphery of the barrel 45 projects through the straight groove 2a to be engaged with the cam groove 3a. A pair of barriers 46 for protecting the photographic lens are provided in the front part of the barrel 45, and the barriers 46 are opened or closed by an actuating lever 47.

By the way, in this embodiment, as described above, the barriers 46 are constructed so as to be manually opened or closed by operating the actuating lever 47. However, the present invention is not to be limited thereto. The barriers may be constructed so as to be automatically opened, by a barrier driving mechanism including a motor which is not shown, in response to the turning on of the power switch SW5 described below, and to be automatically closed, by the barrier driving mechanism which is not shown, in response to the turning off of the switch SW5.

A second unit lens frame 5 is set inside the stationary barrel 2, and the second unit lens frame 5 holds a shake-correcting lens L3, a driving mechanism for driving the shake-correcting lens L3, a shutter 42, and a lens L2 fixed in the shutter 42.

Figures 3, 4:
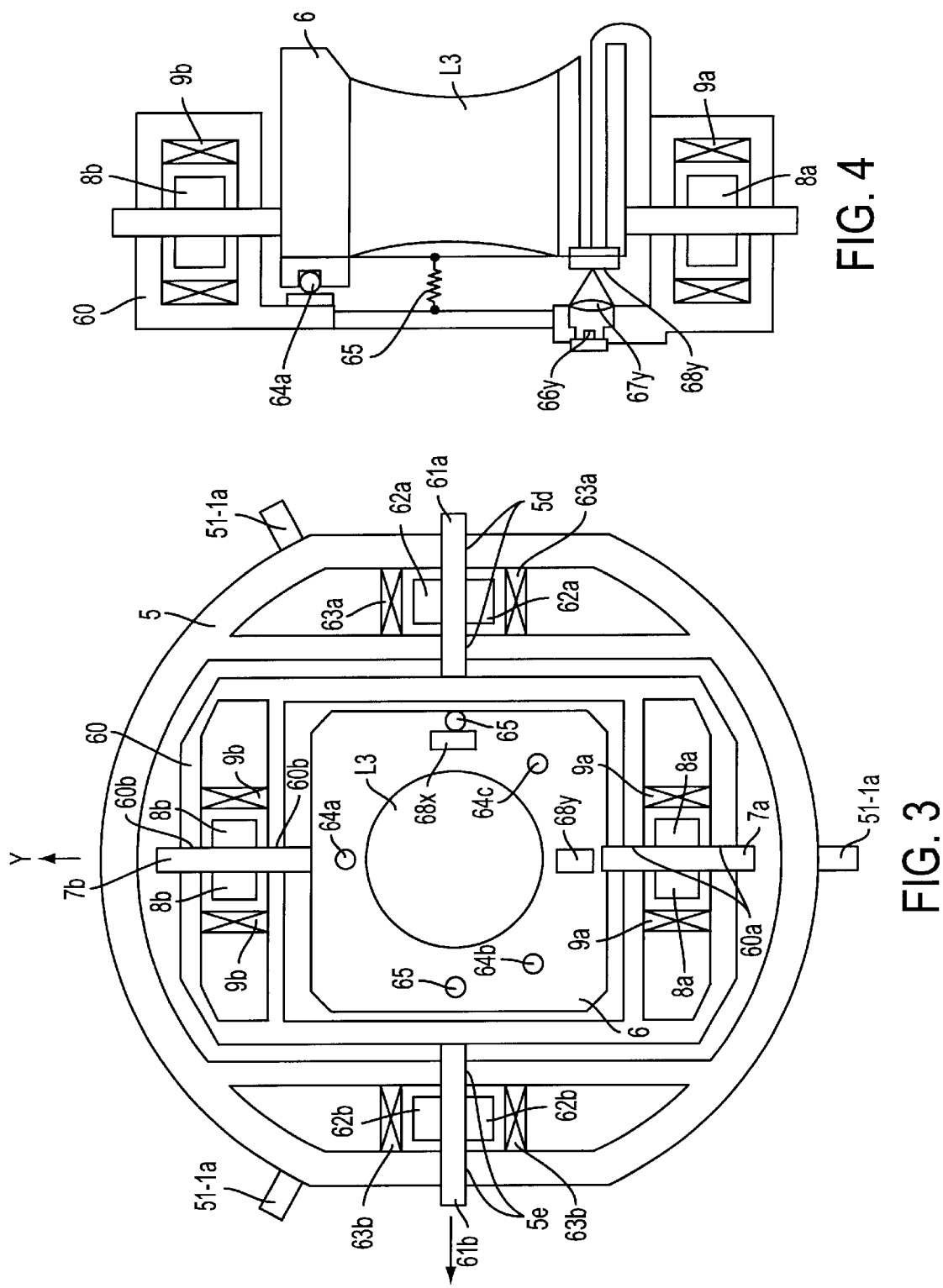
FIG. 3 is a drawing to show the details of a shake-correcting apparatus in the shake-proof camera according to the first embodiment.
FIG. 4 is a drawing to show the details of the shake-correcting apparatus in the shake-proof camera according to the first embodiment.

A lens frame 6 holds the shake-correcting lens L3 of the shake-correcting lens driving mechanism, as shown in FIG. 3. Guide shafts 7a, 7b for guiding in the Y direction are fixed to the lens frame 6, but are arranged as freely movable in the directions along the guide shafts as fit in holes 60a and 60b in an X stage 60. A magnet 8a, 8b is mounted on the periphery of guide shaft 7a, 7b, and a coil 9a, 9b is fixed to the X stage 60 so as to surround the periphery thereof.

Guide shafts 61a and 61b for guiding in the X-axis direction are fixed to the stage 60, and are arranged as freely movable in the directions along the guide shafts in holes 5d and 5e in the second unit lens frame 5. A magnet 62a, 62b is mounted to the periphery of guide shaft 61a, 61b and a coil 63a, 63b is fixed to the second unit lens frame 5 so as to surround the periphery thereof.

FIG. 4 is a cross section to show the shake correcting mechanism of the shake-proof camera according to the present embodiment.

Steel balls 64a–64c (FIG. 3) are provided between the lens frame 6 and the second unit lens frame 5, and a tension spring 65 urges the lens frame 6 toward the second unit lens frame 5. LED 66y and lens 67y are fixed to the second unit lens frame 5 and form an image of a point light source on a PSD device 68a and 68y on the lens frame 6 whereby a moving amount of the lens frame 6 can be detected, and these elements constitute a correcting lens position detector 23 (FIG. 5) of the shake-correcting lens L3.

The shake-correcting lens L3 is driven in the Y direction by energizing the coils 9a, 9b, and based on a position signal from the correcting lens position detector 23, the energization of the coils 9a, 9b is controlled to drive the shake-correcting lens L3 to a predetermined position. The shake-correcting lens L3 is similarly driven in the X direction by energizing the coils 63a, 63b.

When the camera is not used, the coils 9a, 9b, 63a, 63b are not energized, and therefore, there is no restrictions on the shake-correcting lens L3 in the directions perpendicular to the optical axis thereof. Thus, there is a risk of breakage due to collision of the shake-correcting lens L3 with mechanical limits with application of an external force.

A lens shutter mechanism 40 ts incorporated with the second unit lens frame 5, as shown in FIG. 1. The lens shutter mechanism 40 unitarily includes shutter wings 41 also serving as an aperture, and a drive unit 42 for driving the shutter wings 41, and the drive unit 42 is screwed to a base 51-1 with a screw 43. An electric part 42. such as a motor for driving the shutter wings 41 is mounted on the drive unit 42. The lens L2 in held on the internal periphery of the second unit lens frame 5. Here, each of the three cam followers 51-1a planted in the base 51-1 is set through the straight groove 2b to be engaged with the cam groove 3b.

A lens base 51 is inserted in the rear part of the stationary barrel 2, and a helicoid screw 51a is formed on the inner periphery of the lens base and a cam follower 51b is planted on the outer periphery thereof. This cam follower 51b is set through the straight groove 2b to be engaged with the cam groove 3c. A lens holder 52 is a member for holding the focusing lens L4, and a helicoid 52a is formed on the outer periphery thereof. This helicoid 52a is meshed with the helicoid 51a on the lens base 51.

A compression spring 59 is inserted between the lens holder 52 and the lens base 51 to bias the helicoids 52a, 51a to each other with a one-way play.

A focusing motor 53 is provided with a gear 53a unitarily set on an output shaft thereof, and the gear 53a is meshed with the helicoid 51a. The lens holder 52 rotates with rotation of motor 53. As the lens holder 52 rotates, the lens holder 52, in turn, the focusing lens L4 moves in the optical-axis direction through an action of the helicoids 51a, 52a, thereby performing focusing.

The focusing lens L4 has a lock part L4a formed in the front part thereof, and the lock part L4a locks the shake-correcting lens L3 when being in contact with an end portion 6a of the lens holder 6 for the shake-correcting lens L3.

Figure 5:
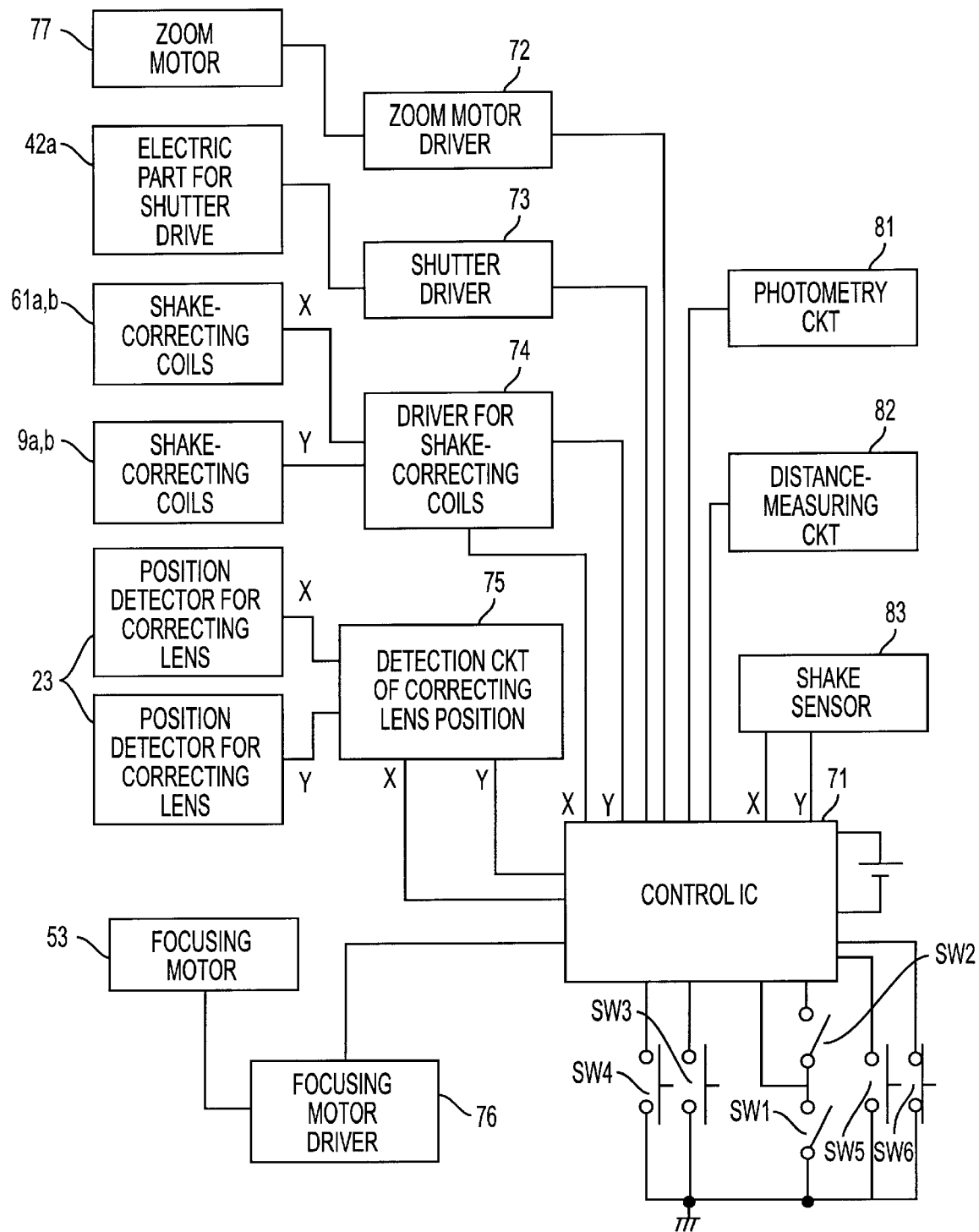
FIG. 5 is a block diagram to show the structure of a control system for the shake-proof camera according to the first embodiment.

FIG. 5 is a block diagram to show a control circuit of the shake-proof camera according to the present embodiment.

A control IC 71 is connected with a photometry circuit 81, a distance-measuring circuit 82, a shake sensor 83 for detecting an amount of a camera shake caused by to a shaking hand, etc.

Further, the control IC 71 is connected through a shutter driver 73 with the electric part 42a for shutter drive. Also, the X- and Y-directional coils 9a, 9b, 61a, 61b are connected through a shake-correcting coil driver 74 to the control IC 71 and the X- and Y-directional correcting lens detectors 23

(PSDs 68X, 68Y and LEDs 66X, 66Y) are connected through a shake-correcting lens position detection circuit 75 to the control IC 71.

The shake-correcting lens position detection circuit 75 detects a moving amount and a moving direction of the shake-correcting lens L3, based on outputs from the correcting-lens detectors 23, and puts them into the control IC 71.

Further, the control IC 71 is connected through a focusing motor driver 76 to the focusing motor 53 and through a zoom motor driver 72 to a zoom motor 77.

Moreover, the control IC 71 is connected to a half-press switch SW1, which is turned on by 4 half-press manipulation of a release button, a release switch SW2, which is turned on by 4 full-press manipulation of the release button, and zooming switches SW3, SW4.

The control IC 71 actuates the photometry circuit 81 and the distance-measuring circuit 82 when the half-press switch SW1 is turned on, and based on a detection output from the distance-measuring circuit 82, the control IC 71 moves the focusing lens L4 in the optical-axis direction to perform focusing. When the full-press switch SW2 is turned on, the control IC 71 drive-controls the shutter drive electric part 42a, based on an output from the photometry circuit 81, to open and close the shutter wings 81. Further, the control IC 71 drive-controls the X- and Y-directional magnets 9a, 9b, 61a, 61b, based on an output from the shake sensor 83 and an output from the shake-correcting lens position detection circuit 75, during shutter release, whereby the shake-correcting lens L3 is moved as necessary in the directions perpendicular to the optical axis so as to suppress image blur caused by a shaking hand.

When the zooming switches SW3, SW4 are turned on, the control IC 71 drives the zoom motor 77 to rotate the cam barrel 3 through the gear GR. Since each cam groove 3a, 3b, 3c moves with rotation of the cam barrel 3, the barrel 45 and the lens bases 51-1, 51 are driven each in the optical-axis direction through the respective cam followers 45a, 5a, 51b, thereby zooming each lens L1-L4 to a predetermined position.

Also, the control IC 71 is provided with a power switch SW5 for starting the camera, and a barrier switch SW6 for detecting a closing state of the lens barriers 46. If the power switch SW5 is off or if the barrier switch SW6 is on, the control IC 71 drives the focusing motor 53 to move the focusing lens L4 forward whereby the lock part L4a thereof is brought into contact with the end portion 6a of the lens holder 6 for the shake-correcting lens L3 to lock actuation of the shake-correcting lens L3.

For the purpose of simplifying the explanation, in the flowcharts (FIGS. 6 and 8) described below, only the operation in the case where the power switch SW5 is turned off, namely the power is off, will be explained, and is omitted the explanation on the operation in the case where barriers 46 are closed, namely the barrier switch SW6 is on. The operation in the case where the barriers 46 are closed, will be understood by replacing the switch SW5 in the description thereon in the flowcharts with the barrier switch SW6.

Figure 6B:
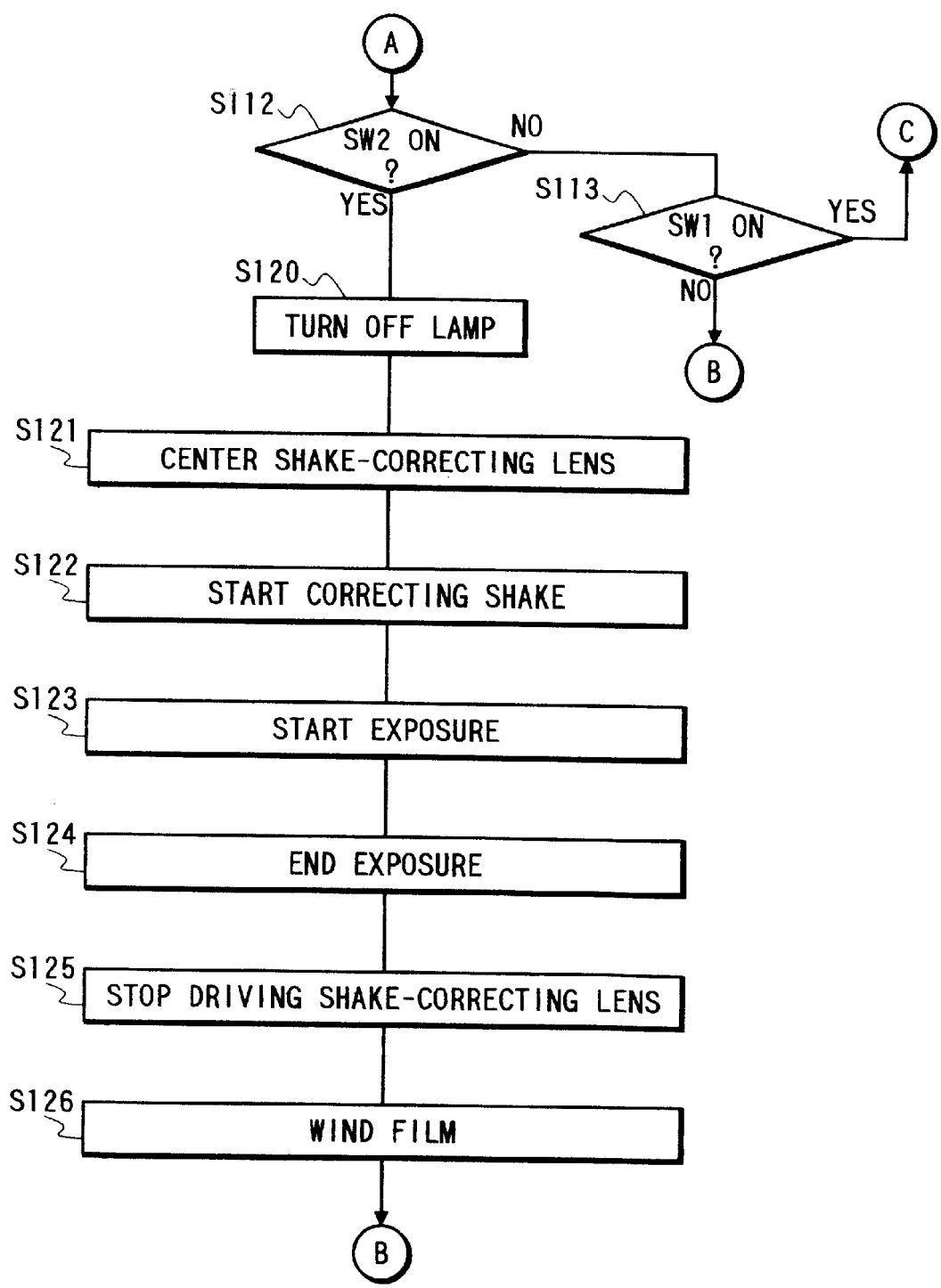
FIG. 6 is composed of FIG. 6A and FIG. 6B, and is a flowchart to illustrate the operation of the shake-proof camera according to the first embodiment.

FIG. 6 is a flowchart to illustrate the operation of the first embodiment of the shake-proof camera according to the present invention.

The first embodiment is so arranged that the shake-correcting lens L3 is locked (in the state of FIG. 1) when the zoom barrel is retracted and that the shake-correcting lens L3 is unlocked (in the state of FIG. 2) when the zoom barrel is driven to the W end.

When the main switch or power switch SW5 is turned on at S102, the flow proceeds to S103 to perform battery check (B. C.); if the voltage is enough, the flow proceeds to S104.

At S104 the shake-correcting lens L3 is centered. The reason of this is to hold the shake-correcting lens L3 at the center position (not shown) in order to prevent the shake-correcting lens L3 from dropping in the direction of the gravity when the shake-correcting lens L3 is freed as projecting the barrel from the lock state.

At S105 the photographic lens barrel is driven to the W end. Namely, the photographic lens barrel is projected out so as to free the shake-correcting lens L3 from the lock state. As the lens barrel is projected to the W end position, a spacing increases between the shake-correcting lens L3 and the focusing lens L4 to bring the shake-correcting lens L3, which has been fit in the lens frame 52 of the focusing lens L4, outside so as to free it from the lock state (FIG. 2).

At S106 the shake-correcting lens L3 is stopped driving after completion of the drive of the photographic lens barrel to the W end. Namely, the shake-correcting lens L3 is stopped at the mechanical limit position in the direction of the gravity when the centering drive operation is terminated.

At S107 a state of the main switch (SW5) is checked; if it is kept in an on state, the flow proceeds to S108 to determine whether the half-press switch SW1 is on or off. If the half-press switch SW1 is on, the flow proceeds to S109; if it is off, the flow returns to S107.

At S104 the shake sensor 83 is started, at S110 the photometry and distance measurement is carried out, and thereafter at S111, based on a result of distance measurement, the focusing lens is driven to perform the focusing operation.

At S112 it is determined whether the full-press switch SW2 of the shutter release switch is on or off. If the full-press switch SW2 is off, the flow proceeds to S113 to check the state of the half-press switch SW1. If at S113 the half-press switch SW1 is held on, the flow proceeds to S114; if it is off, the flow returns to S108.

At S114, it is determined whether an amount of a shake of camera detected by the shake sensor 83 is not more than a predetermined value A or not. If the shake amount is not more than the predetermined value A then the flow proceeds to S115 to light a shake indication lamp; if the shake amount is larger than the predetermined value then the flow proceeds to S116 to blink the shake indication lamp. Then the flow returns to S112 from either step.

If at S107 the main switch SW5 is off, the flow proceeds to S117 to first center the shake-correcting lens L3 to get ready for bringing the shake-correcting lens L3 into the lock state. After the shake-correcting lens moves to the center position, the photographic lens barrel is reset-driven (S118) to be retracted, whereby the focusing lens L4 comes into fit with the shake-correcting lens L3 to lock it (FIG. 1). After completion of the reset drive of the photographic lens barrel, the centering drive operation of the shake-correcting lens is stopped (S119), and the operation is ended (S127).

When the full-press switch SW2 is on at S112, the shake indication lamp is put out (S120) and the shake-correcting lens is centered (S121). Then the shake correcting drive is started (S122), and further, exposure is started (S123). The shake-correcting lens L3 is driven, based on a detection signal from the shake sensor 83, only while the shutter is opening.

At S124 the shutter is closed based on an exposure calculation result to end the exposure operation. Further, the shake correcting drive is stopped (S125) and the film is wound up by one frame (S126). Then the flow returns to S107.

As described above, because the present embodiment is so arranged that the focusing lens L4 moving in the optical-axis direction upon focusing is moved forward in the optical-axis direction to bring the lock part L4a into contact with the end portion 6a of the lens holder 6 for the shake-correcting lens L3 so as to lock the actuation of the shake-correcting lens L3, the present embodiment can lock the shake-correcting lens L3 without using a new actuator.

Further, when the focusing lens L4 is in contact with the end portion 6a of the lens holder 6, they can be biased against each other with a suitable force by the action of the compression spring 59.

Since the shake-correcting lens L3 is locked in synchronization with the movement of the photographic lens barrel, the shake-proof mechanism etc. can be prevented from being damaged by movement of the shake-correcting lens L3 due to an external force or the like when the camera is not used.

Second Embodiment

Figure 7:
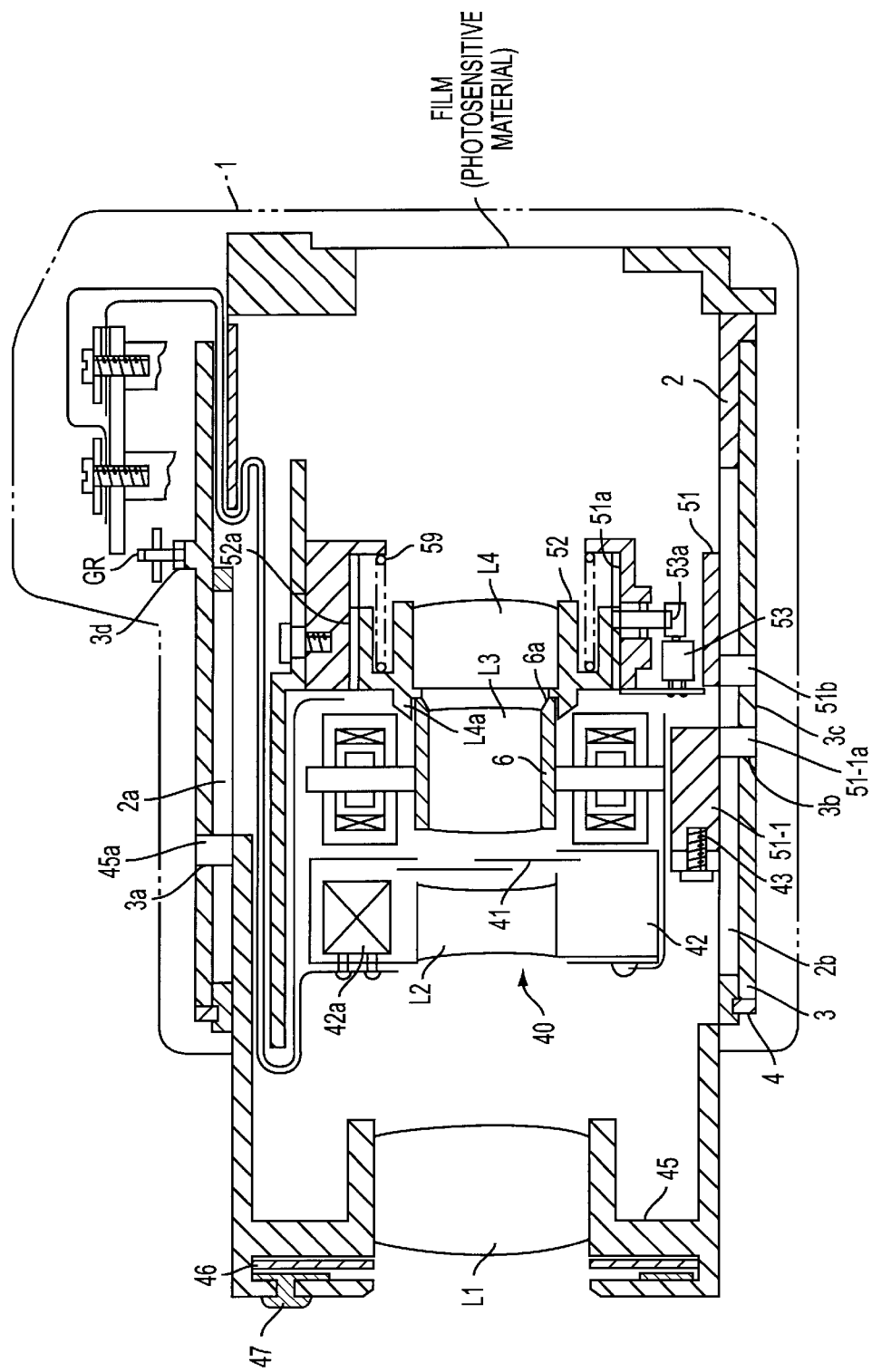
FIG. 7 is a side cross section of a barrel-integral-type camera (zoom camera) to which a second embodiment of the shake-proof camera according to the present invention is applied, showing a locking state thereof upon focusing return.

FIG. 7 is a side cross section of a barrel-integral-type camera (zoom camera) to which the second embodiment of the shake-proof camera according to the present invention is applied, showing a lock state thereof upon focusing return.

Figure 8B:
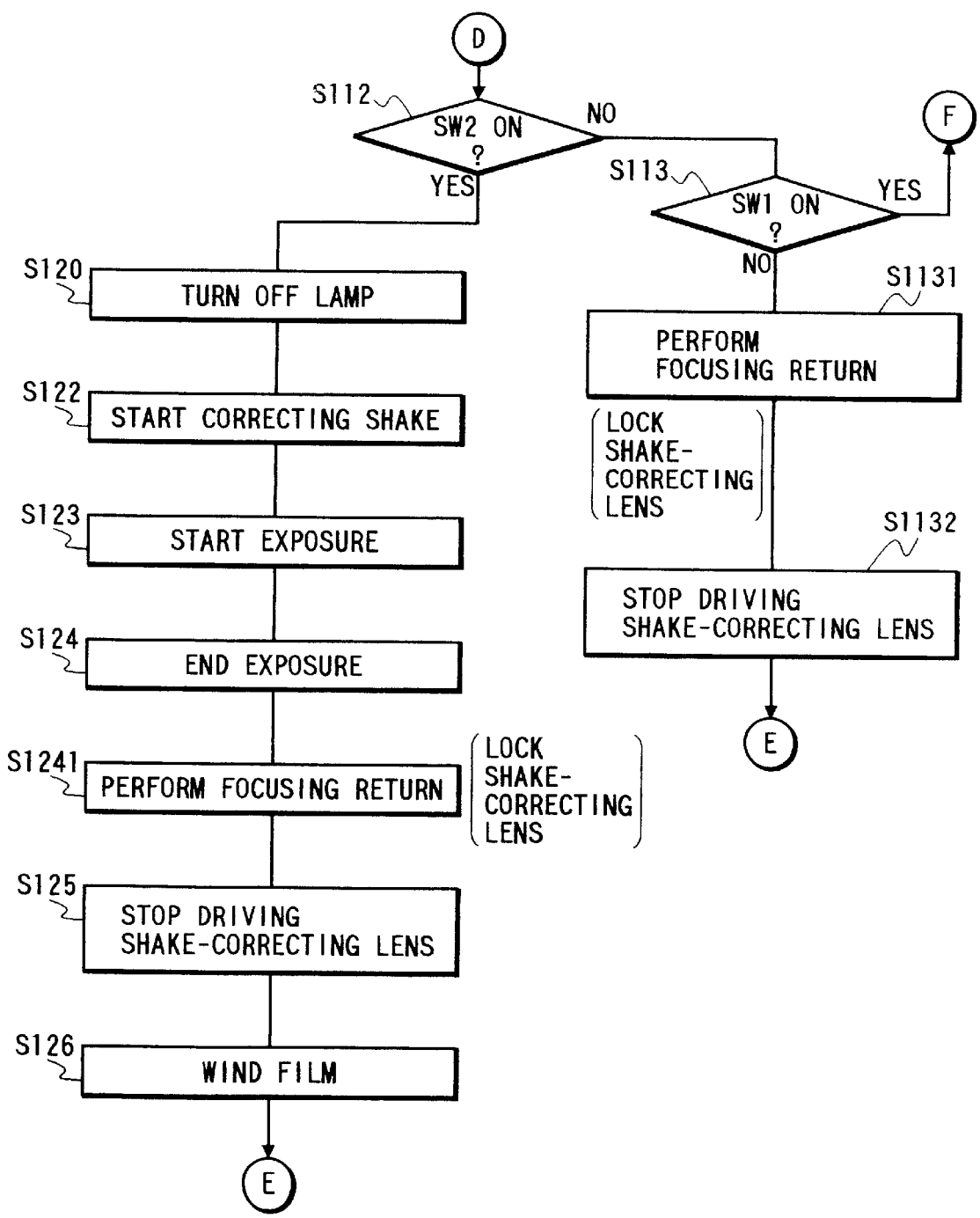
FIG. 8 is composed of FIG. 8A and FIG. 8B, and is a flowchart to illustrate the operation of the shake-proof camera according to the second embodiment.

FIG. 8 is a flowchart to illustrate the operation of the second embodiment of the shake-proof camera according to the present invention. In each embodiment to follow, elements with similar functions to those in the first embodiment will be denoted by the same reference numerals, and redundant figures and description thereof will be omitted if appropriate.

The second embodiment is so arranged that the shake-correcting lens L3 is unlocked (in the state of FIG. 2) upon focusing and that the shake-correcting lens L3 is locked (in the state of FIG. 7) upon focusing return.

Namely, at S1101 the shake-correcting lens L3 is centered and thereafter at S111 focusing is started and the shake-correcting lens L3 is unlocked.

On the other hand, if at S113 the half-press switch SW1 is off, the focusing return is performed at S1131 to lock the shake-correcting lens L3, and at S1132 the shake-correcting lens L3 is stopped driving.

After exposure is ended at S124, the focusing return is performed at S1241, the shake-correcting lens L3 is centered, and then the shake-correcting lens L3 is locked. Then the shake-correcting lens L3 is stopped driving at S125.

Third Embodiment

Figure 9:
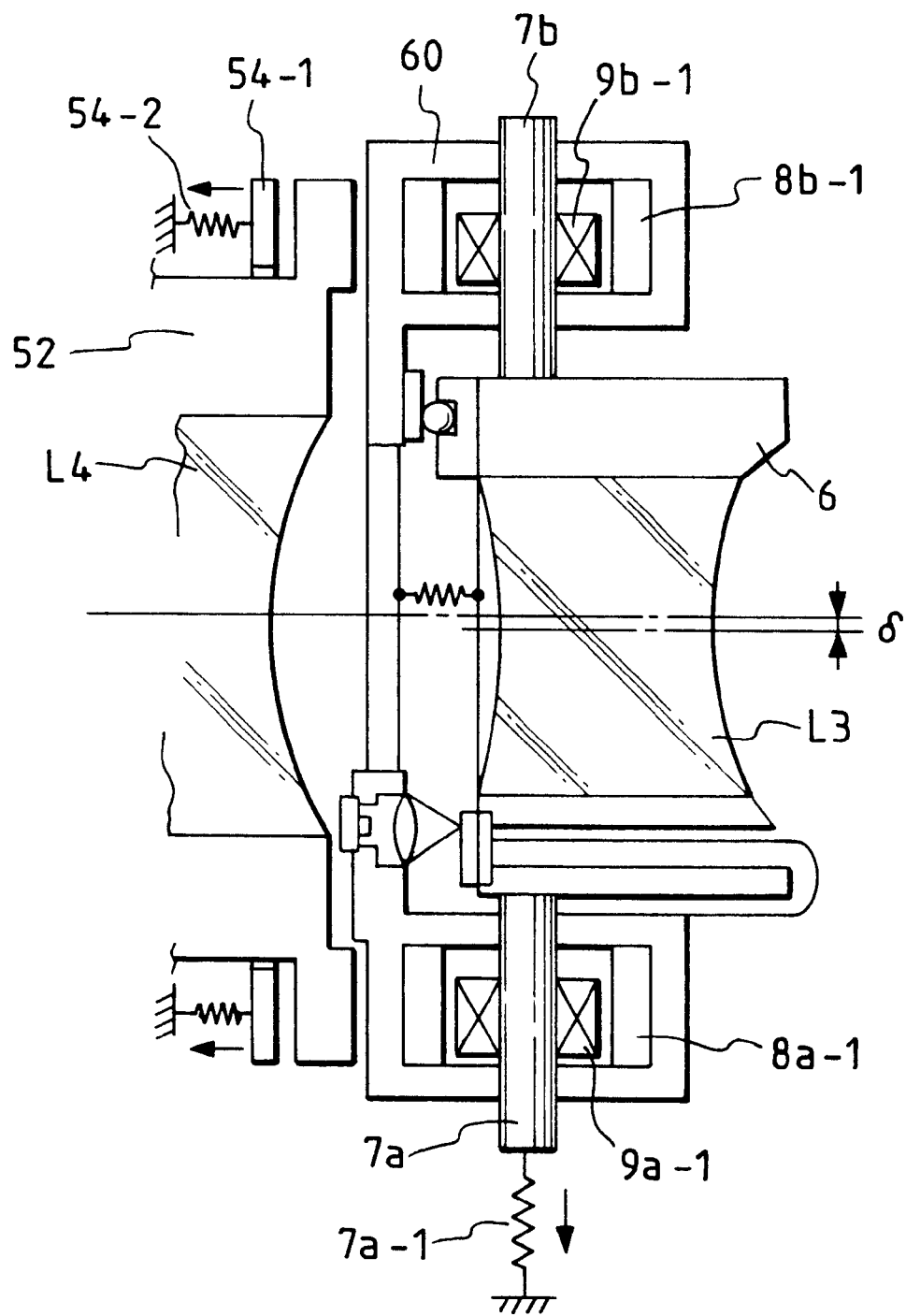
FIG. 9 is a drawing to show the details of a shake-correcting apparatus in the shake-proof camera according to the third embodiment.

FIG. 9 is a cross section to show a major part of the third embodiment of the shake-proof camera according to the present invention.

In the third embodiment, a coil 9a-1, 9b-1 is attached to the outer periphery of the guide shaft 7a, 7b, and a magnet 8a-1, 8b-1 is fixed to the X stage 60 so as to surround the periphery thereof. The lens frame 6 is offset by δ from the optical-axis center, and the guide shaft 7b is urged downward by a spring 7a-1.

The lens holder 52 is provided with an iron piece 54-1 that can be attracted by the magnets 8a-1, 8b-1, at a position opposed to the magnets 8a-1, 8b-1, and the iron piece 54-1 is urged by springs 54-2 in the direction away from the magnets 8a-1, 8b-1.

The third embodiment is so arranged that when the shake-proof drive is stopped to turn off energization of the coils 9a-1, 9b-1 and when the lens holder 52 comes within a predetermined distance, the magnetic force of the magnets 8a-1, 8b-1 attracts and holds the iron piece 54-1, thereby locking the lens frame 6 of the shake-correcting lens L3.

It is noted that the present invention is not limited to the embodiments as described above, but a variety of modifications and changes can be constructed. The present invention involves such modifications and changes.

For example, the moving lens for locking the shake-correcting lens was the focusing lens as an example, but it may be a zoom lens.

Also, locking and unlocking of the shake-correcting lens may be carried out in synchronization with the power switch SW5 or the lens barrier switch SW6.

What is claimed is:

1. A shake-proof camera comprising:
   a first lens functioning as a shake-correcting lens portion that corrects a shake by changing an optical axis of a photographic optical system in a direction substantially perpendicular to the optical axis, the first lens being used for shake-correction;
   a first lens frame that holds said first lens;
   a second lens, distinct from said first lens, functioning as a focusing lens portion disposed in a vicinity of said shake-correcting lens portion and arranged as movable in a direction of the optical axis, said second lens being moved for focusing without moving said first lens of said shake-correcting lens portion;
   a second lens frame that holds said second lens; and
   a shake-correcting lens lock apparatus disposed on said second lens frame and that prevents said first lens from moving in a direction perpendicular to the optical axis when said shake-correcting lens lock apparatus is in contact with at least a portion of said first lens frame.

2. A shake-proof camera according to claim 1, further comprising a shake-correcting drive portion comprised of permanent magnets and coils with iron cores moving relative to each other, said shake-correcting drive portion electromagnetically driving said shake-correcting lens portion.

3. A shake-proof camera according to claim 2, wherein said shake-correcting lens lock apparatus locks said moving-lens portion by attracting and holding said moving lens portion and said shake-correcting lens portion by the permanent magnets in said shake-correcting drive portion.

4. A shake-proof camera according to claim 2, wherein said shake-correcting lens lock apparatus performs a locking operation in synchronization with an off state of a power switch.

5. A shake-proof camera according to claim 2, wherein said shake-correcting lens lock apparatus performs a locking operation in synchronization with a closing operation of a photographic lens barrier.

6. A shake-proof camera according to claim 2, wherein said shake-correcting lens lock apparatus performs a locking operation in synchronization with an end operation of a shutter release operation.

7. A shake-proof camera according to claim 2, wherein said shake-correcting lens lock apparatus performs a locking operation in synchronization with a return operation of said focus lens.

8. A shake-proof camera according to claim 2, wherein said shake-correcting lens lock apparatus returns said shake-correcting lens portion to a shake-proof reference position before performing a locking operation.

9. A shake-proof camera according to claim 2, wherein said shake-correcting lens lock apparatus returns said moving lens portion and said shake-correcting lens portion to a plurality of respective lens receding positions after said moving lens portion and said shake-correcting lens portion are brought into contact with each other.

10. A shake-proof camera according to claim 2, wherein said shake-correcting lens lock apparatus returns said moving lens portion and said shake-correcting lens portion to a plurality of respective lens receding positions as said moving lens portion and said shake-correcting lens portion are kept in contact with each other.

11. A shake-proof camera according to claim 2, wherein said shake-correcting lens lock apparatus brings said moving lens portion and said shake-correcting lens portion into contact with each other after said moving lens portion and said shake-correcting lens portion return to a plurality of respective lens receding positions.

12. A shake-proof camera according to claim 2, wherein said shake-correcting lens lock apparatus performs an unlocking operation in synchronization with an on state of a power switch.

13. A shake-proof camera according to claim 2, wherein said shake-correcting lens lock apparatus performs an unlocking operation in synchronization with an opening operation of a photographic lens barrier.

14. A shake-proof camera according to claim 2, wherein said shake-correcting lens lock apparatus performs an unlocking operation in synchronization with manipulation of photographic preparation start.

15. A shake-proof camera according to claim 2, wherein said shake-correcting lens lock apparatus performs an unlocking operation in synchronization with a shutter release operation.

16. A shake-proof camera according to claim 2, wherein said shake-correcting lens lock apparatus performs an unlocking operation as holding a lock position.

17. A shake-proof camera, comprising:
a first lens functioning as a shake-correcting lens portion that corrects a shake by changing an optical axis of a photographic optical system in a direction substantially perpendicular to the optical axis, the first lens being used for shake-correction;
a first lens frame that holds said first lens;
a second lens, distinct from said first lens, functioning as a focusing lens portion disposed in a vicinity of said shake-correcting lens portion and arranged as movable in a direction of the optical axis, said second lens being moved for focusing without moving said first lens of said shake-correcting lens portion;
a second lens frame that holds said second lens;
a shake-correcting lens lock apparatus disposed on said second lens frame and that prevents said first lens from moving in a direction perpendicular to the optical axis when said shake-correcting lens lock apparatus is in contact with at least a portion of said first lens frame; and
a shake indication lamp to be turned on when the shake is less than or equal to a predetermined level, and to blink when the shake is greater than the predetermined level.

18. A shake-proof camera, comprising:
a first lens functioning as a shake-correcting lens portion that corrects a shake by changing an optical axis of a photographic optical system in a direction substantially perpendicular to the optical axis, the first lens being used for shake-correction;
a first lens frame that holds said first lens;
a second lens, distinct from said first lens, functioning as a focusing lens portion disposed in a vicinity of said shake-correcting lens portion and arranged as movable only in a direction of the optical axis, said second lens being moved for focusing without moving said first lens of said shake-correcting lens portion;
a second lens frame that holds said second lens and has a contact portion, the contact portion coming into contact with at least a portion of said first lens frame due to movement of said second lens in the direction of the optical axis, thereby preventing such movement of said first lens as to change a position of the optical axis.

19. A shake-proof camera according to claim 18, wherein said contact portion comes into contact with said first lens frame when the focusing operation of said second lens does not take place.

* * * * *